United States Patent
Plutchak et al.

(10) Patent No.: US 7,609,872 B2
(45) Date of Patent: Oct. 27, 2009

(54) METHOD AND APPARATUS FOR VERIFYING THE AUTHENTICITY OF DOCUMENTS

(75) Inventors: Thomas M. Plutchak, Hilton, NY (US); John R. Lawson, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 820 days.

(21) Appl. No.: 11/089,496

(22) Filed: Mar. 24, 2005

(65) Prior Publication Data

US 2005/0234857 A1    Oct. 20, 2005

Related U.S. Application Data

(60) Provisional application No. 60/559,525, filed on Apr. 5, 2004.

(51) Int. Cl.
*G06K 9/00*    (2006.01)
(52) U.S. Cl. ......... 382/137; 382/138; 382/112; 382/140
(58) Field of Classification Search ......... 358/1.14, 358/3.28
See application file for complete search history.

(56) References Cited

U.S. PATENT DOCUMENTS

| | | | | |
|---|---|---|---|---|
| 6,321,648 | B1 * | 11/2001 | Berson et al. | 101/32 |
| 6,952,484 | B1 * | 10/2005 | Higginbottom et al. | 382/100 |
| 7,181,081 | B2 * | 2/2007 | Sandrew | 382/254 |
| 7,197,644 | B2 * | 3/2007 | Brewington | 713/176 |

* cited by examiner

*Primary Examiner*—Brian P Werner
*Assistant Examiner*—Claire Wang
(74) *Attorney, Agent, or Firm*—Peyton C. Watkins

(57) ABSTRACT

A method for verifying the authenticity of a document utilizes artifacts of the printing process. The method includes optically capturing at a predetermined magnification a first image of an indicia printed on the authentic document. A corresponding indicia on a document to be authenticated is optically captured at a predetermined magnification. The captured images and the printing process artifacts depicted therein are characterized. Authenticity is verified where the characterization indicates the captured images are sufficiently identical. An indication is issued as to whether the document is authentic.

5 Claims, 8 Drawing Sheets

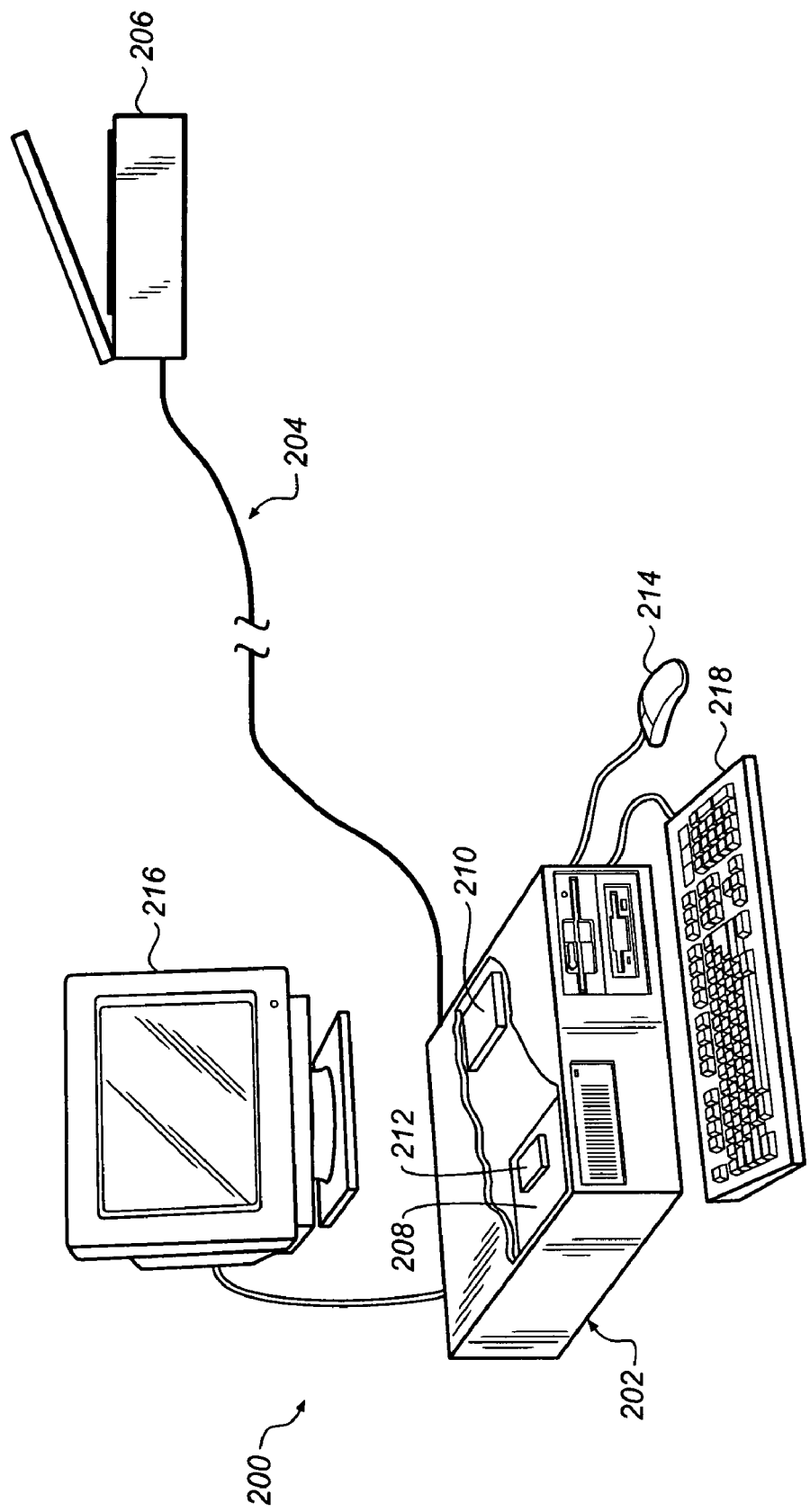

METHOD AND APPARATUS FOR VERIFYING THE AUTHENTICITY OF DOCUMENTS

CROSS-REFERENCE TO RELATED APPLICATIONS

This application claims the benefit of U.S. Provisional Patent Application No. 60/559,525, filed Apr. 5, 2004.

FIELD OF THE INVENTION

The present invention relates to a method and apparatus for verifying the authenticity of documents.

BACKGROUND OF THE INVENTION

Advancing technology, particularly the technologies of personal computing, optical scanning, desktop publishing, printing, and color copying, has greatly simplified the act of counterfeiting. A person with a modest personal computer system, scanner and printer can very quickly create a reasonably high-quality reproduction that can often be convincingly represented and accepted as an original document. Therefore, many original documents now incorporate anticounterfeiting features, such as, for example, holograms, watermarks, embedded security threads, microprinting, foil stamping, and many other features.

Incorporating such anticounterfeiting features into an original document can be costly and time consuming. Original documents that include security features are typically more expensive to produce than documents that do not include such features. Further, the process of incorporating one or more new security features into an original document may take several years. The security features must be selected, a new version of the original document designed, and the original documents containing the new security features must then be printed and placed into circulation. By the time this process is completed the particular security features may already be obsolete, or may be compromised or convincingly reproduced in a relatively short time period. In either case, the authenticity of all original documents incorporating the compromised security feature is suspect, and the original documents must be again redesigned to include new security features.

Therefore, what is needed in the art is an improved method and apparatus for verifying the authenticity of original documents.

SUMMARY OF THE INVENTION

The present invention provides a system and method for verifying the authenticity of a document utilizing artifacts of the printing process used to create the document.

The invention comprises, in one form thereof, the process of optically capturing at a predetermined magnification a first image of an indicia on or a predetermined area of the authentic document. A corresponding indicia on or area of a document to be authenticated is optically captured at a predetermined magnification. The captured images and the printing process artifacts depicted therein are characterized. Authenticity is verified where the characterization indicates the captured images are sufficiently identical. An indication is issued as to whether the document is authentic.

An advantage of the present invention is that artifacts of the printing process that occur randomly and are difficult to duplicate are used to verify the authenticity of a document.

Another advantage of the present invention is that it utilizes existing artifacts of the printing process and therefore requires no special anticounterfeiting devices or measures.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein:

FIG. 9 is a diagram of one embodiment for a system of verifying the authenticity of documents of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE DRAWINGS

Figure 1:
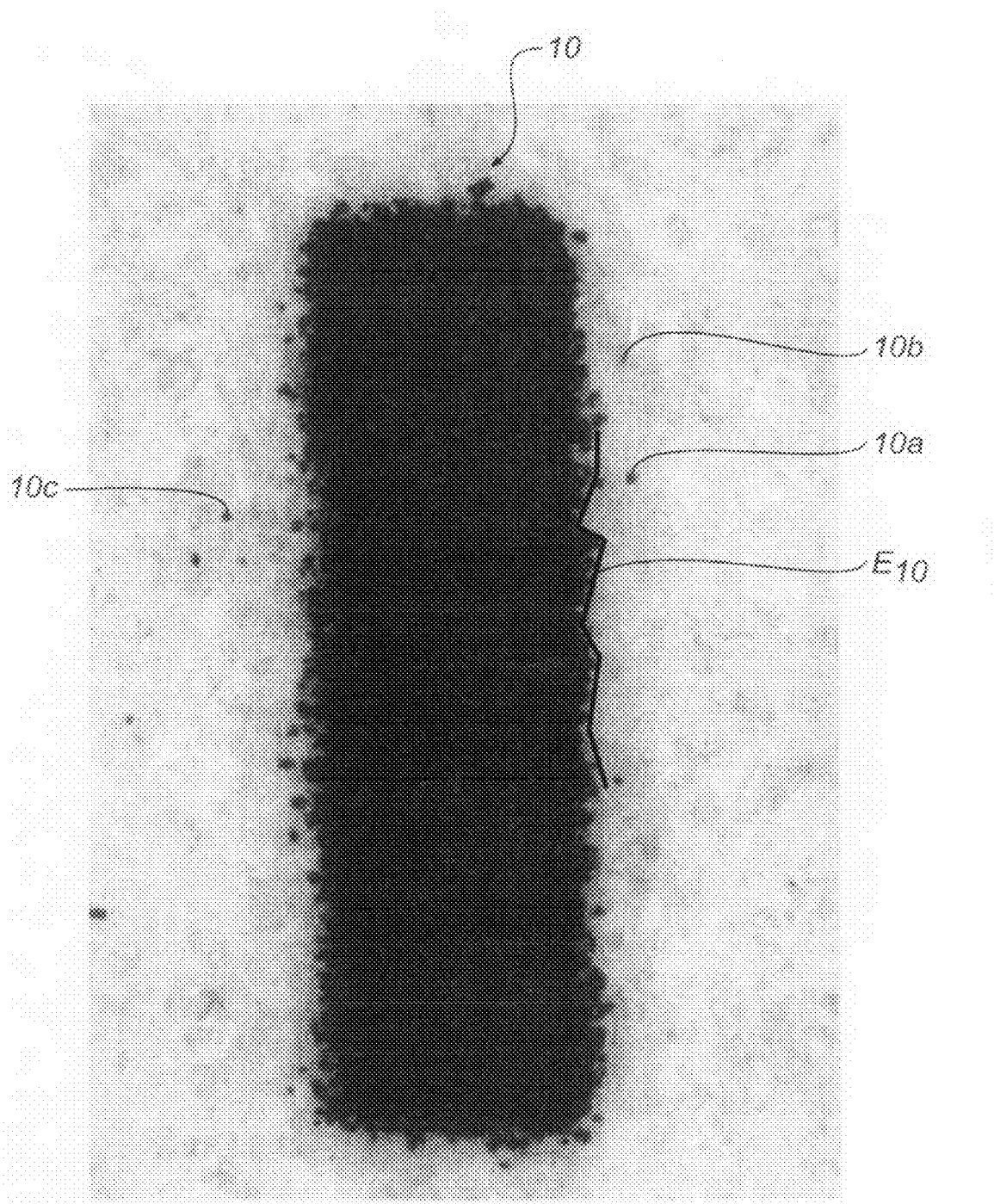
FIG. 1 is a photomicrograph of a first electrophotographically-produced dash character magnified approximately one-hundred times.
Figure 2:
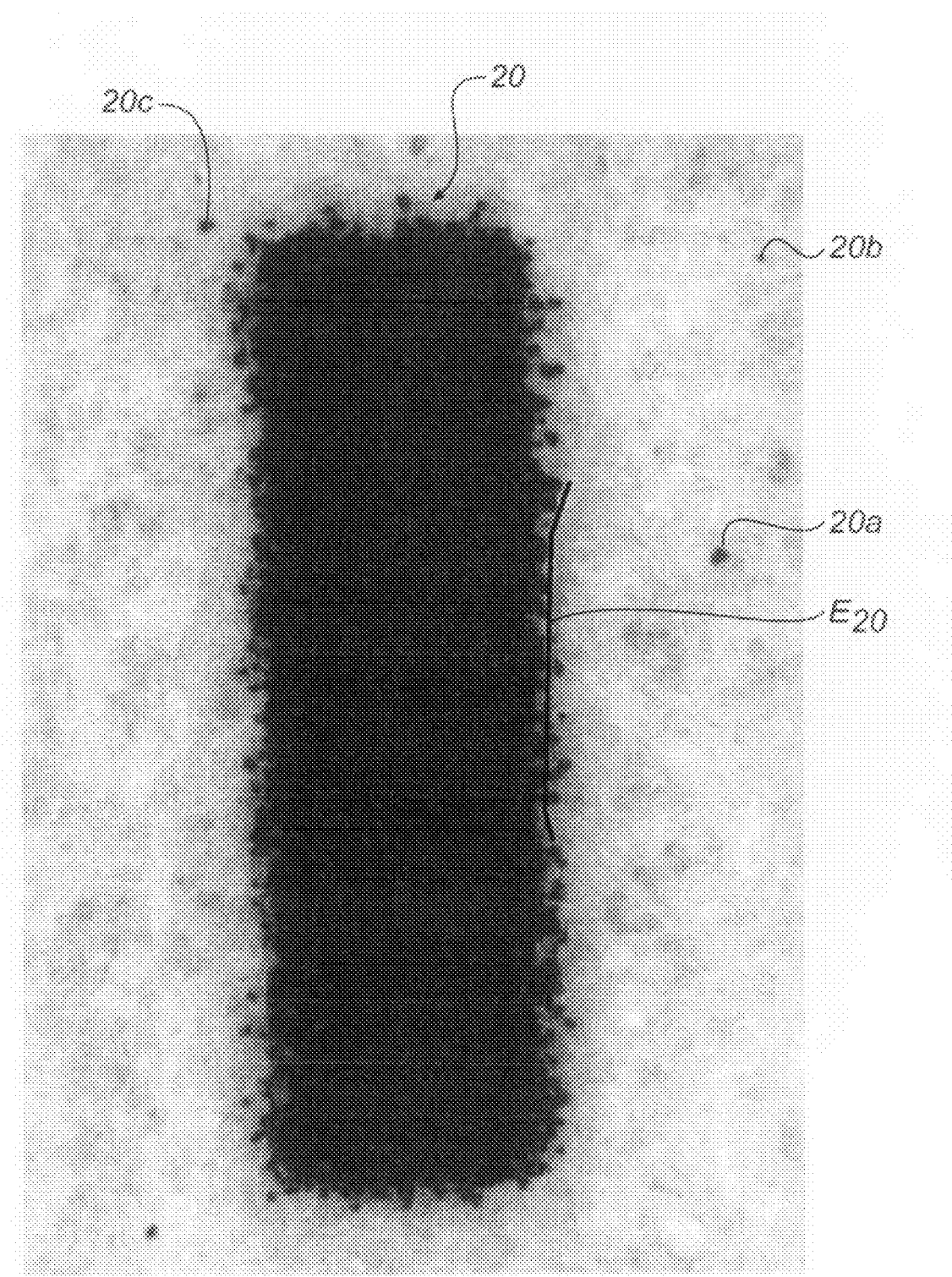
FIG. 2 is a photomicrograph of a second electrophotographically-produced dash character magnified approximately one-hundred times.
Figure 3:
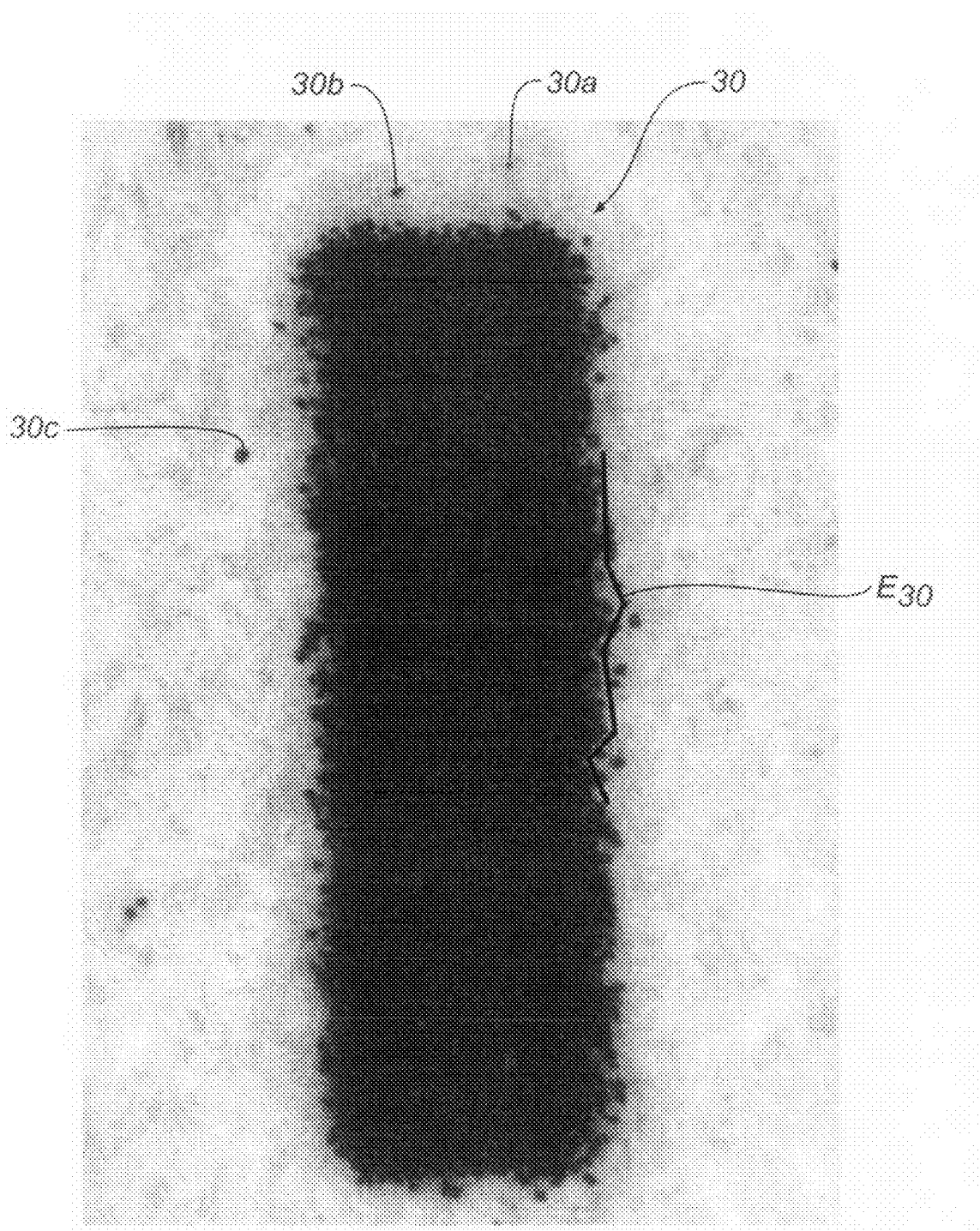
FIG. 3 is a photomicrograph of a third electrophotographically produced dash character magnified approximately one-hundred times.

Referring now to FIGS. 1-3, three exemplary electrophotographically-produced dash characters magnified approximately one-hundred times are shown. Generally, dash characters 10, (FIG. 1), 20 (FIG. 2) and 30 (FIG. 3) each have random, naturally-occurring and unique features that are a result of the electrophotographic printing process by which the characters were produced and which make the characters distinguishable from each other.

More particularly, dash character 10 has an edge profile $E_{10}$ and a plurality of satellite particles including 10a, 10b and 10c. Similarly, dash character 20 has an edge profile $E_{20}$ and a plurality of satellite particles including 20a, 20b and 20c. Further, dash character 30 similarly has an edge profile $E_{30}$ and a plurality of satellite particles including 30a, 30b and 30c. Edge profiles $E_{10}$, $E_{20}$ and $E_{30}$ and satellite particles 10a-c, 20a-c and 30a-c are random and unique artifacts of the electrophotographic process by which the characters were produced. It should be particularly noted that the peripheral regions of characters 10, 20 and 30 that correspond to edge profiles $E_{10}$, $E_{20}$ and $E_{30}$, and satellite particles 10a-c, 20a-c and 30a-c are exemplary, and that other peripheral regions and/or satellite particles can be selected and are suitable for use with the present invention.

The artifacts shown are the result of toner particles which are transferred from a dielectric belt or photoconductor to an image-receiving sheet, such as, for example, a piece of paper, by an electric field. Most of the individual toner particles are densely packed together to form the main body of a particular character. However, the toner particles on the outer periphery of the characters are less densely packed together and thereby form the uneven or jagged edge profiles $E_{10}$, $E_{20}$ and $E_{30}$. Further, toner particles that are drawn and/or randomly deposited on and then fused to the area outside of the main body of the characters form satellite particles $10a$-$c$, $20a$-$c$ and $30a$-$c$. Each character has unique electrophotographic artifacts similar to those described above. The present invention utilizes those electrophotographic artifacts as a basis by which to distinguish an original or authentic character and/or document from an unauthorized copy, counterfeit, or other non-original version thereof.

Figure 4:
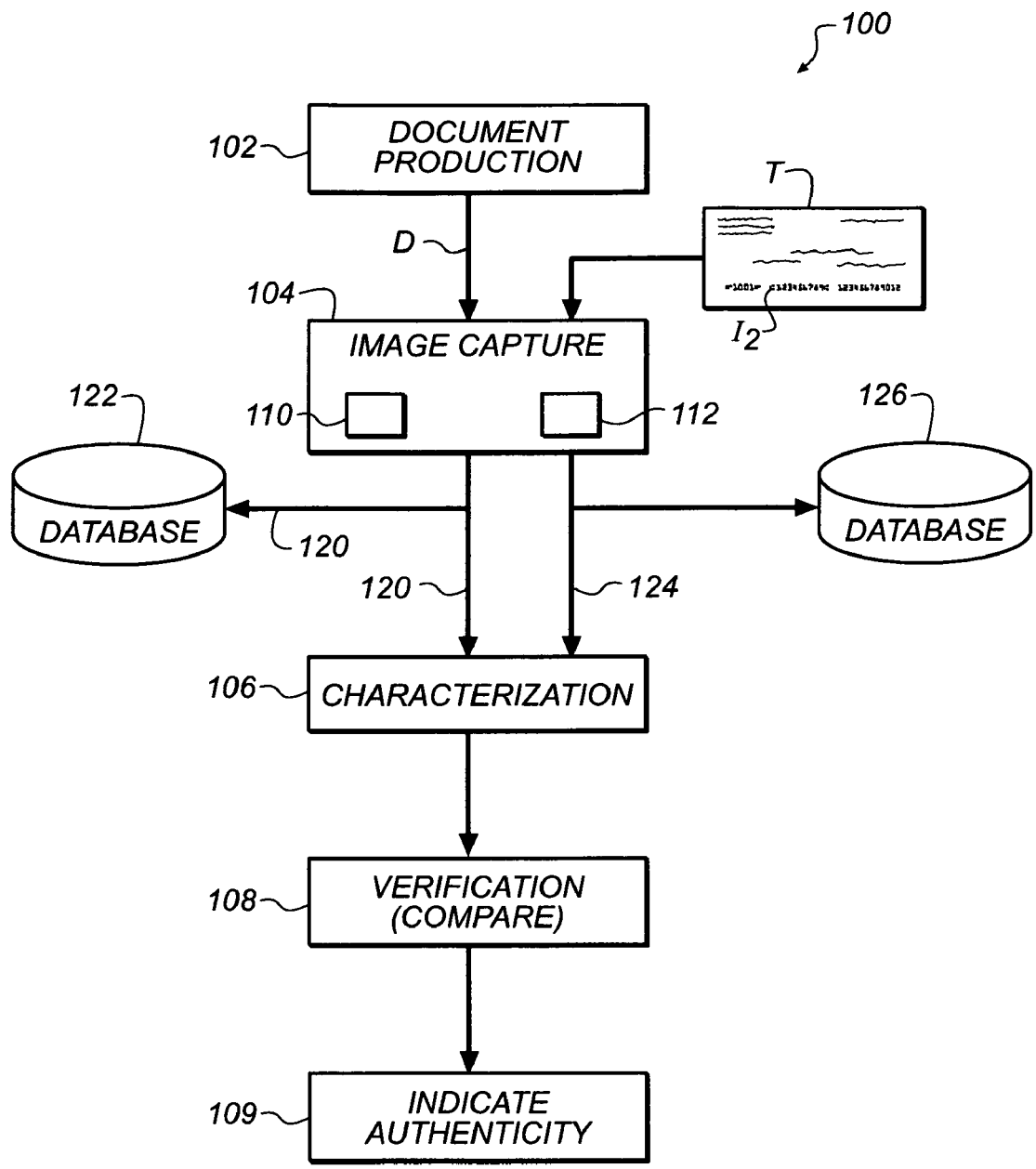
FIG. 4 is a flow chart of one embodiment of a method for verifying the authenticity of documents of the present invention.

Referring now to FIG. 4, a flow diagram of one embodiment of a method for verifying an original document in accordance with the present invention is shown. Method 100 includes the processes of original document production 102, image capture 104, characterization 106, verification 108, and indicating authenticity 109.

Figure 5:
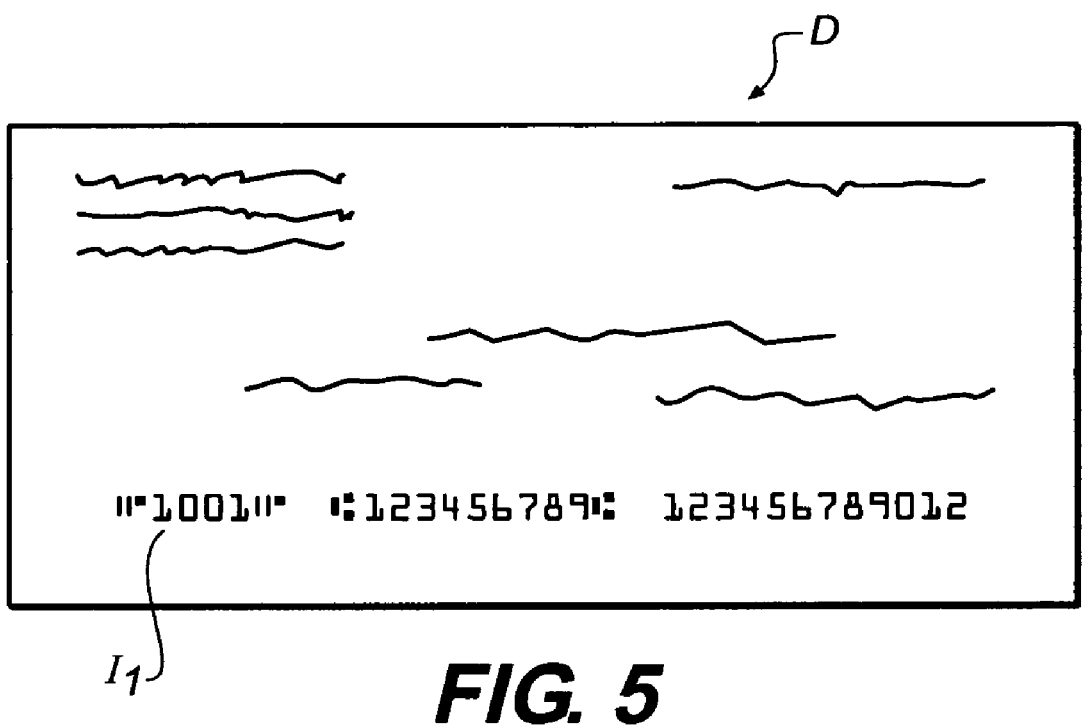
FIG. 5 is an elevational view of one embodiment of an authentic document.

Original document production 102 involves the creation of one or more original/authentic documents D. Authentic document D, as best shown in FIG. 5, includes characters and/or other indicia, and may optionally include individual identifying characters or indicia $I_1$, such as, for example, serial numbers, issue dates, bar codes, or other suitable indicia. At least one character on authentic document D is produced electrophotographically.

In the exemplary embodiments shown and discussed herein, identifying characters/indicia $I_1$ are produced electrophotographically. However, it is to be understood that identifying characters/indicia $I_1$ do not have to be produced electrophotographically and that any other character or characters on authentic document D, or the entire authentic document D, can be produced electrophotographically and, therefore, suitably used for the method of the present invention.

Although the exemplary embodiments shown and discussed herein refer to characters and/or indicia that are electrophotographically produced, it should be particularly understood that various other printing processes, such as, for example, ink jet printing, electron beam printing, magnetographic printing, and conventional printing processes, are suitable for use with the method of the present invention.

Image capture 104 generally includes the process of optically capturing one or more predetermined areas or regions of an authentic document D that contains or includes one or more electrophotographically-produced characters, such as, for example, characters/indicia $I_1$, or of capturing one or more predetermined portions of one or more such characters. The predetermined regions and/or electrophotographically-produced characters or portions thereof are optically captured by an image capture device, such as, for example, an optical scanner, camera, or other suitable optical sensor, at a magnification of from approximately fifty to approximately two-hundred times, preferably from approximately eighty to approximately one-hundred and twenty times, and most preferably at approximately one-hundred times.

The magnified and optically-captured images 110 are converted to computer-readable image files 120, such as, for example, computer files in the Graphic Image Format (GIF), Joint Photographic Experts Group (JPEG), or other suitable file formats. Image files 120, in turn, are stored and retained in data base 122.

Test document T is also processed through an image capture process to, in general, obtain a basis by which to compare test document T with authentic document D in order to determine whether test document T is authentic. For convenience of illustration, test document T is shown in FIG. 4 as being processed through the same image capture process 104 as authentic document D. However, it is to be understood that, typically, test document T is processed through a separate image capture process or through the same image capture process subsequent to document D.

More particularly, test document T contains or includes one or more characters $I_2$ that correspond to characters/indicia $I_1$ of authentic document D. The one or more predetermined areas and/or characters/indicia $I_2$ of test document T are optically captured by an image capture device at the same magnification at which characters/indicia $I_1$ of authentic document D were captured, and the resulting magnified and optically-captured images 112 are converted to computer-readable image files 124 in the same format as files 120. Image files 124 are either stored and retained in data base 126, which may be the same data base as or a data base other than data base 122, for reference and use by verification process 108, or may alternately be retained by other means on either a permanent or temporary basis, such as, for example, random access memory of a personal computer.

Characterization process 106 generally includes characterizing the optically-captured images 110 and 112 of authentic document D and test document T, respectively, using any one or a combination of more than one image characterization or coding methods, and the retention or storing of the characterization information or parameters generated thereby.

Verification (or comparison) process 108 generally involves the comparison of the characterization information or parameters generated for each document by characterization process 106 to determine whether document T is an authentic document. Indicating authenticity 109 simply involves indicating whether the test document T is in fact an authentic document by any of a variety of methods.

Figure 6:
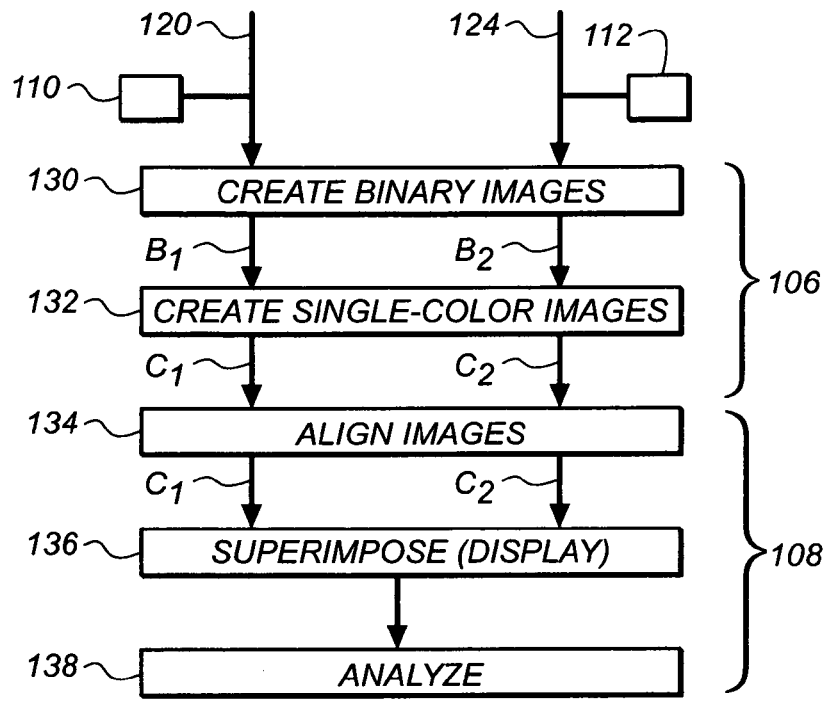
FIG. 6 is a detail view of one embodiment of a characterization and verification process of the method of FIG. 4.

Referring now to FIG. 6, a first exemplary embodiment of characterization process 106 and verification process 108 of the present invention is shown. Although specific and exemplary embodiments of characterization process 106 and verification process 108 are provided herein, it should be particularly understood that other methods may be used in addition to, in conjunction with and/or in place of the exemplary embodiments.

Characterization process 106 includes the processes of creating binary images 130, creating single-color images 132, aligning images 134, superimposing images 136 and analyzing and indicating authenticity 138.

More particularly, the process of creating binary images 130 involves the creation of a binarized image $B_1$ of optically-captured image 110 of authentic document D and a binarized image $B_2$ of optically-captured image 112 of test document T. A single-color image $C_1$ is then made from binarized image $B_1$, and a single-color image $C_2$ of a color different than image $C_1$ is made from binarized image $B_2$ in creating single-color images process 132. The single-color images $C_1$ and $C_2$ are retained for use in verification process 108, as described below.

Verification process 108, in this exemplary embodiment, involves the processes of aligning images 134, superimposing images 136, and analyzing and indicating authenticity 138. Aligning images process 134 involves aligning, such as, for example, by a process or technique including mathematical convolution, image $C_1$ with image $C_2$. The resulting matrix provides data which enables the images $C_1$ and $C_2$ to be aligned and compared. After aligning images $C_1$ and $C_2$, the single and different color images $C_1$ and $C_2$ are superimposed in alignment with each other and displayed by superimpose process 136. The final displayed image will, potentially, be a three-color image, i.e., a first color for the portions of image $C_1$ that are not common with image $C_2$, a second color for the portions of image $C_2$ that are not common with image $C_1$, and a third composite color for the overlapping or common portions of images $C_1$ and $C_2$.

For example, where image $C_1$ is a first color and image $C_2$ is a second color, the overlapping or common portions of the displayed superimposition of images $C_1$ and $C_2$ will be a composite (additive) third color. If test document T is in fact an authentic document (i.e., it is document D) the superimposition of images $C_1$ and $C_2$ will be substantially entirely of the composite color. Any portion of image $C_1$ (which depicts indicia $I_1$ of document D) that is not in image $C_2$ (which depicts indicia $I_2$ of document T) appears in a color that is the compliment of the first color, whereas any portion of image $C_2$ that is not in image $C_1$ appears in a color this is the compliment of the second color. Any nonconformity between images $C_1$ and $C_2$, and therefore between documents D and T, is color contrasted and therefore readily discernible in analyze and indicate process 138. Thus, method 100 verifies document T as an authentic document when the superimposition of images $C_1$ and $C_2$ is substantially entirely of the composite color. Similarly, method 100 indicates that document T is not an authentic document when the superimposition of images $C_1$ and $C_2$ includes portions that are of the first or second colors only and which, alone or in combination, exceed predetermined limits that include factors adjusting and/or compensating for system error, such as, for example, measurement and imaging error.

Figure 7:
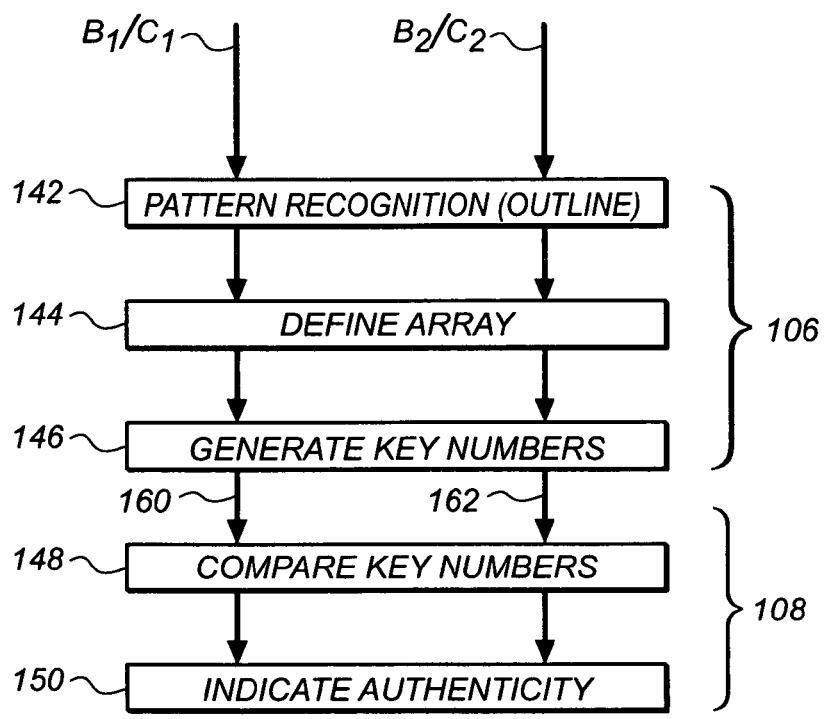
FIG. 7 is a detail view of a second embodiment of a characterization and verification process of the method of FIG. 4.

Referring now to FIG. 7, a second exemplary embodiment of characterization process 106 and verification process 108 of the present invention is shown that includes comparing single-color image $C_1$ or binarized image $B_1$ of the authentic/original document to the corresponding single-color image $C_2$ or binarized image $B_2$ of a document to be authenticated. Conjunctively, in this embodiment, characterization process 106 and verification process 108 include pattern recognition process 142, array definition process 144, key number generation process 146, comparison process 148, and indicating authenticity 150.

Figure 8:
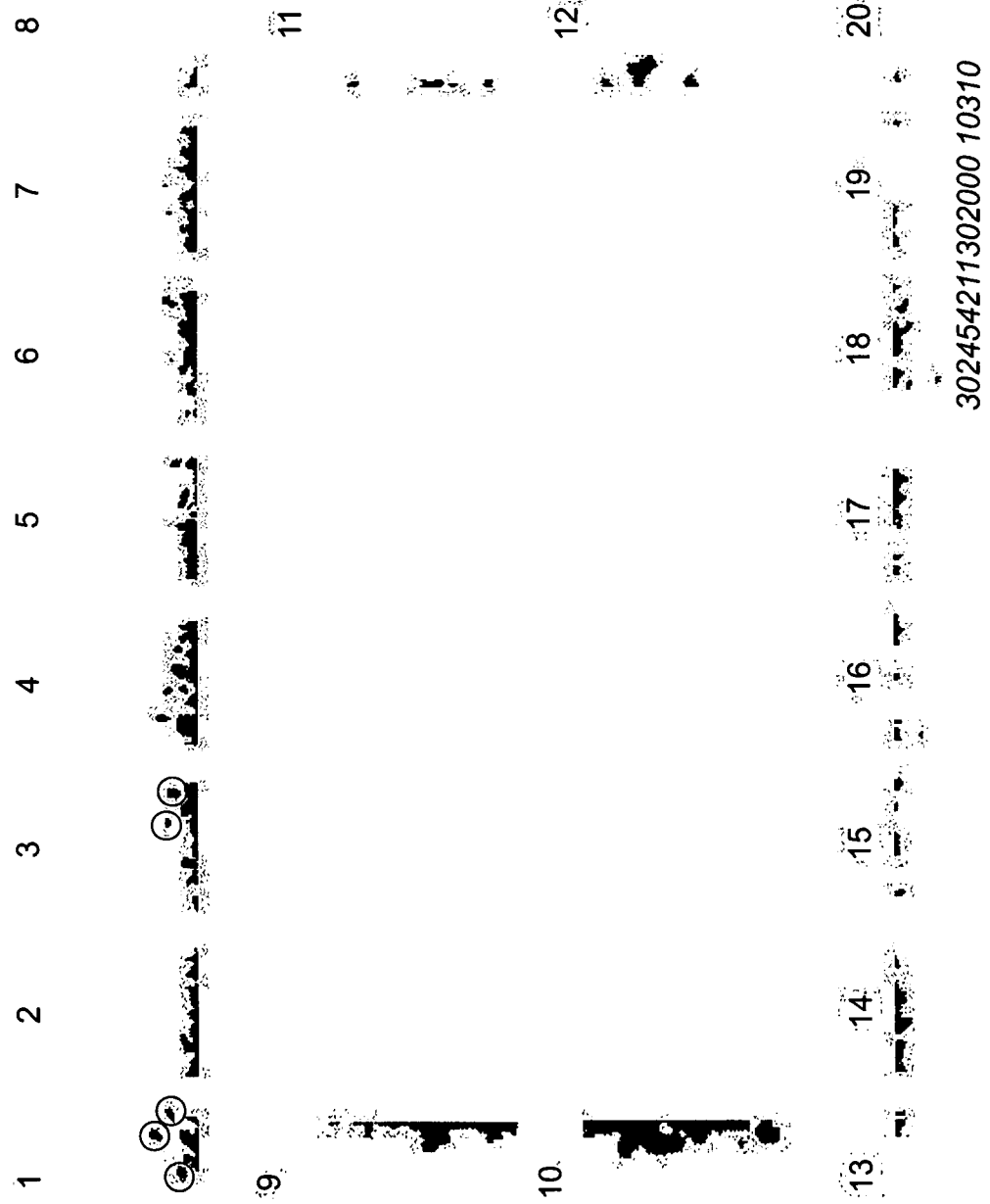
FIG. 8 is a detail view of a photomicrograph showing only the edge portions of a printed character at a magnification of approximately one-hundred times.

More particularly, pattern recognition process 142 includes the performance of a pattern recognition method or algorithm which determines the boundaries or outline of the main body of a character or portion thereof within each image (i.e., $C_1$ or $B_1$ and $C_2$ or $B_2$). Array definition process 144, as best shown in FIG. 8 for image $B_1$, divides the area adjacent to and/or lying outside of the main body or outline of each image into a number of cells C1-C20.

The number of image artifacts within each cell C1-C20 and which are not part of or contiguous with the body of the images are counted. The number derived for each cell is recorded as one digit in a twenty-digit numerical key. For example, the first digit of the numerical key corresponds to the number of particles counted in cell C1, the second digit of the numerical key corresponds to the number of particles counted in cell C2, etc., and the twentieth digit of the numerical key corresponds to the number of particles counted in cell C20.

The key number 160 for image $B_1$ of authentic document D is shown at the bottom of FIG. 7, and the particles within cell C1 that were counted to arrive at the number assigned to the first digit of key number 160 have been circled for illustration. Thus, a twenty-digit key number 160 is created that describes or characterizes image $B_1$ and, thus, authentic document D.

It should be understood, however, that the key number can be alternately configured, such as, for example, with a greater or fewer number of digits, with more than one digit corresponding to a cell, etc. Further, depending upon the characteristics of the key number, it should be understood that the key number may not be unique in all cases.

As shown in FIG. 7, image $B_2$ of test document T also undergoes characterization processes 106, and a corresponding key number 162 is derived. Since the process is substantially identical to the process described above in regard to authentic document D and image $B_1$, it is not reproduced in detail.

Verification 108, in this embodiment, involves comparing the two keys 160 and 162 for images $C_1$ and $C_2$. Document T is considered to be authentic when keys 160 and 162 match within a predetermined tolerance limit that reflects or takes into consideration system error. Conversely, document T is considered to be not authentic if keys 160 and 162 do not match within the predetermined acceptable tolerance limit.

Referring now to FIG. 9, a system for verifying the authenticity of a document having one or more electrophotographically-produced indicia of the present invention is shown. System 200 includes a personal computer 202 connected via network 204 to scanner 206. Network 204 also connects databases 122 and 126 (FIG. 4) with computer 202. Computer 202 further includes hard disk drive 208 and memory 210, such as, for example, read only and random access memory. Application software 212 is stored on computer 202, such as, for example, on hard disk drive 208, and is executable thereby. Alternatively, application software 212 is accessible via network 204. Computer 202 also includes mouse 214, display 216 and keyboard 218. Application software 212 embodies, and when executed by computer 202 executes, method 100 as described above.

In the embodiment shown, both authentic document D and test document T are processed through the same image capture process 104. However, it is to be understood that authentic document D and test document T can be processed through different and/or separate image capture processes in order to produce the images and the image capture files for use in other processes of the method of the present invention.

In one of the embodiments shown, verification process 108 includes an alignment process that uses a mathematical convolution technique to provide data used for aligning the images for comparison. However, it is to be understood that other methods and/or techniques can be used to derive such alignment data, such as, for example, an alignment process that uses a fast fourier transform technique.

In the exemplary embodiments shown and discussed herein, identifying characters/indicia $I_1$ are produced electrophotographically. However, it is to be understood that identifying characters/indicia $I_1$ do not have to be produced electrophotographically and that any other character or characters on authentic document D, or the entire authentic document D, can be produced electrophotographically and, therefore, suitably used for the method of the present invention.

Although the exemplary embodiments shown and discussed herein refer to characters and/or indicia that are electrophotographically produced, it should be particularly understood that various other printing processes that similarly create printing process artifacts are also suitable for use with the method of the present invention, such as, for example, ink jet printing, electron beam printing, magnetographic printing, and other printing processes.

It should further be particularly noted that the method of the present invention is suitable for use with black and white as well as color indicia.

In one of the embodiments shown, images of the documents are stored for later use in the verification process. However, it is to be understood that the method of the present invention can be alternately configured to store one or more characterization parameters, such as, for example, key numbers as described herein, in a database for use in the verification process.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A method of verifying the authenticity of a test document relative to an authentic document, each of the documents having at least one indicia printed thereon, said method comprising:

- optically capturing at a predetermined magnification a first image of at least a portion of said indicia on the authentic document;
- optically capturing at a predetermined magnification a second image of a corresponding portion of said indicia on the test document;
- characterizing the first and second images;
- verifying whether said first and second images are sufficiently identical; and
- indicating whether the test document is authentic;

wherein said characterizing process comprises:
- creating respective first and second binary images based upon said first and second images; and
- creating respective first and second single-color images based upon said first and second binary images, said first single-color image having a first color, said second single-color image having a second color, said first color being, different from said second color; and wherein said verifying process comprises:
- aligning the first and second single and different color images;
- superimposing the aligned first and second single and different color images to produce a superimposed image of a composite color; and
- analyzing the images to determine whether the first and second single and different color images are substantially identical.

2. The method of claim 1, wherein said analyzing process comprises identifying one or more portions of the superimposed image having one of the first or second color.

3. The method of claim 2, wherein said analyzing process determines at least one of a percentage of the superimposed image that is of the composite color, a percentage of the superimposed image that is of the first color, and a percentage of the superimposed image that is of the second color.

4. The method as in claim 1 further comprising the step of displaying the superimposed images.

5. The method as in claim 4 further comprising the step of displaying the displayed image in three colors; a first color for portions of the first and second single and different color images in common; a second color for portions of the first and second single and different color images not in common; and a third color for portions of the first and second single and different color images overlapping portions.

* * * * *